June 4, 1968 W. A. VAN DEN BROEK 3,386,419
LIQUID FILTERING AND HEATING APPARATUS
Filed Aug. 18, 1966 3 Sheets-Sheet 1
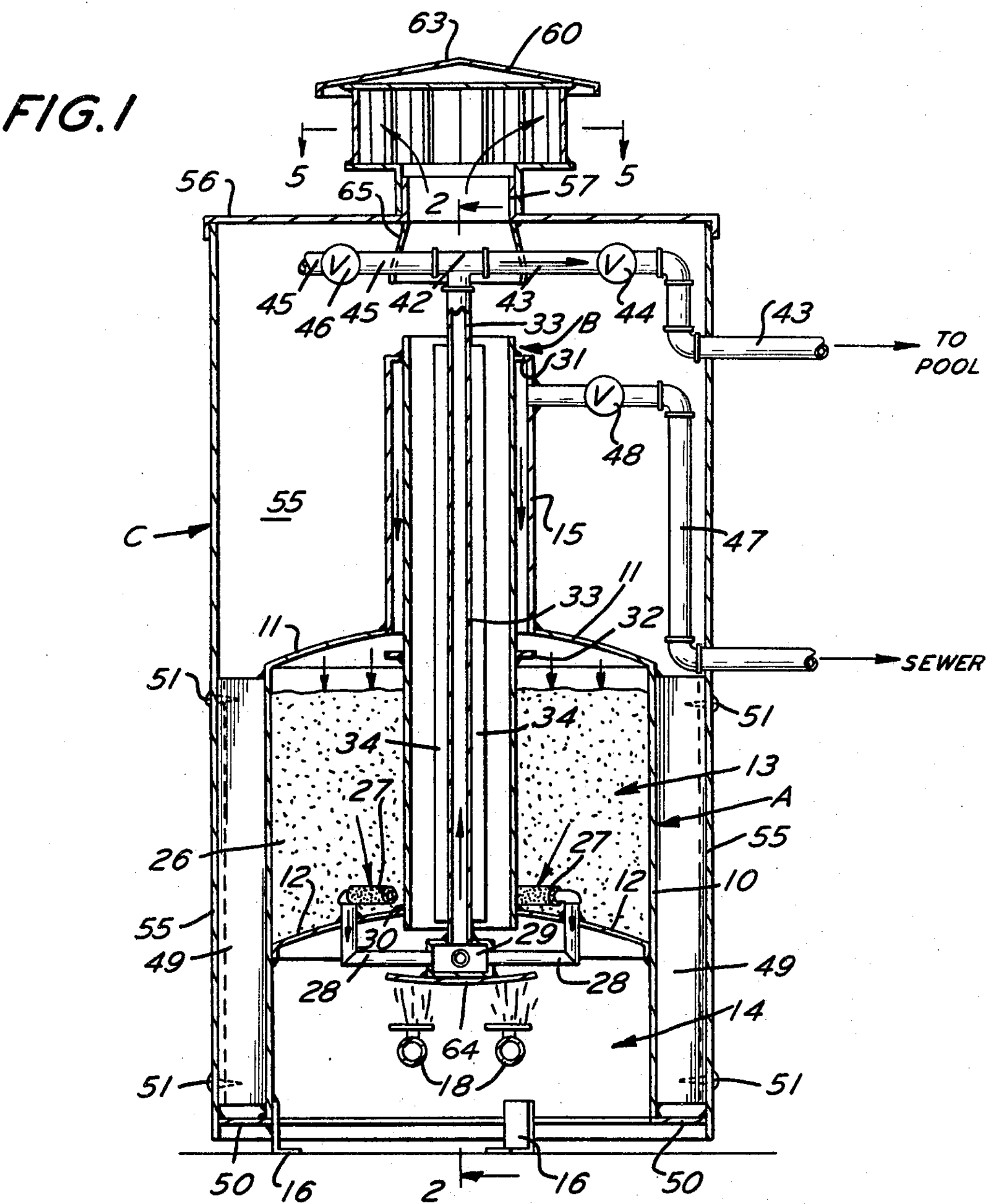
INVENTOR
WILLIAM A. VAN DEN BROEK
BY
Bilker, Kimmelman + Moyerman
ATTORNEYS.

LIQUID FILTERING AND HEATING APPARATUS

Filed Aug. 18, 1966 3 Sheets-Sheet 2

INVENTOR
WILLIAM A. VAN DEN BROEK

BY
Bilker, Kimmelman + Moyerman.
ATTORNEYS.

LIQUID FILTERING AND HEATING APPARATUS
Filed Aug. 18, 1966 3 Sheets-Sheet 3
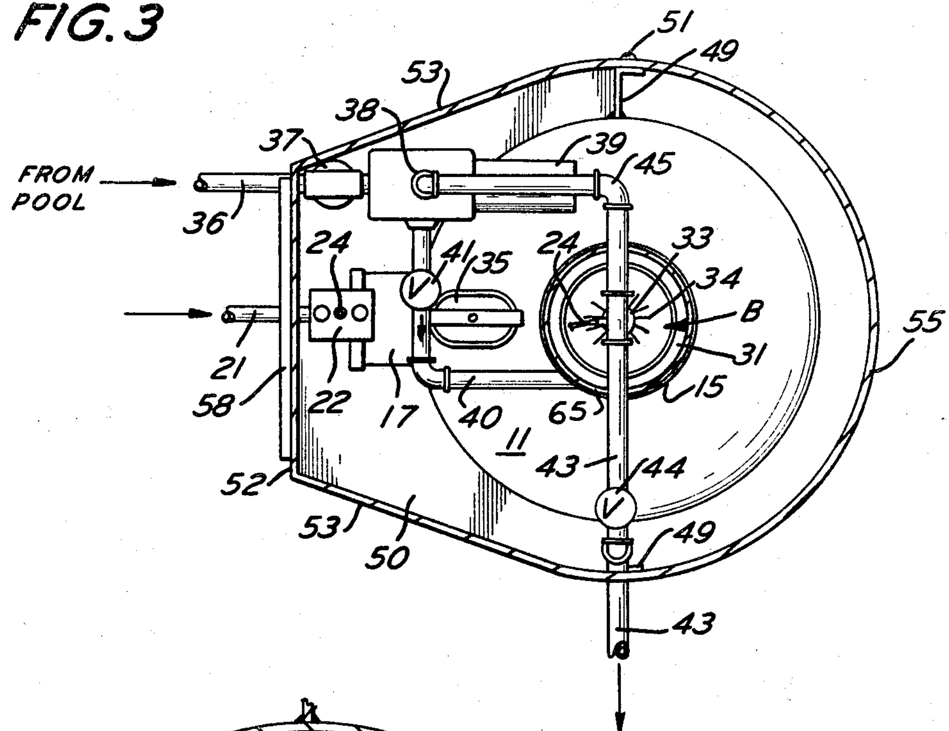
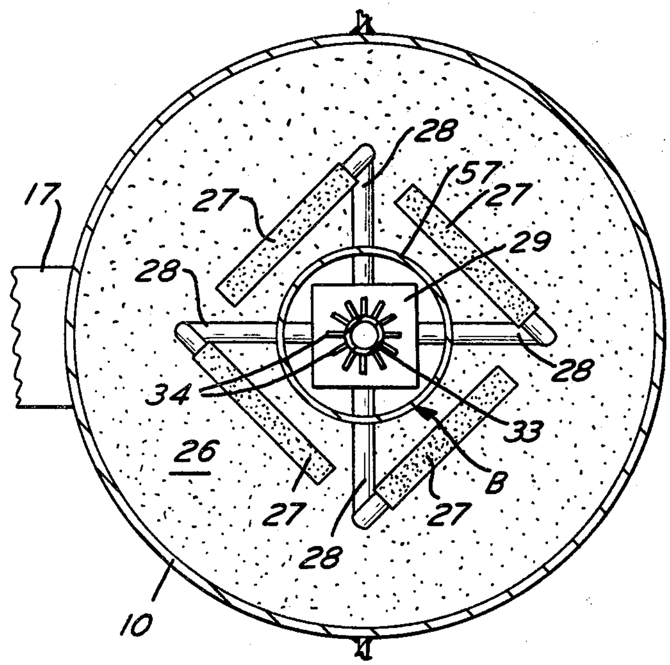
FIG. 4
INVENTOR
WILLIAM A. VAN DEN BROEK
BY
Bilker, Kimmelman + Mayerman.
ATTORNEYS.

United States Patent Office 3,386,419 Patented June 4, 1968

3,386,419
LIQUID FILTERING AND HEATING APPARATUS

William A. van den Broek, Doylestown, Pa., assignor to Sylvan Pools, Inc., Doylestown, Pa., a corporation of Pennsylvania Filed Aug. 18, 1966, Ser. No. 573,257
10 Claims. (Cl. 122—18)

ABSTRACT OF THE DISCLOSURE

A liquid filter-heater combination, useful for swimming pools, containing in a single shell a filter, a combustion chamber and a heater. The filter includes a primary silicious filtration zone and a secondary foraminous filter. Filtered water is heated, not only as it flows through the heat exchanger but also by the heat exchanging relationships of internal surfaces, including those common to both filter and combustion chamber.

This invention pertains to liquid filtering and heating apparatus. More particularly, it relates to liquid filter-heater combinations which have particular utility in connection with the operation of swimming pools.

Swimming pools, of the type wherein the same water is recirculated, have long had associated with them filtration apparatus for removing solid impurities from the water. It has also been customary to heat swimming pool water in those installations where it is desired to extend the length of the swimming season. Such heating has been customarily performed with separate water heaters generally resembling domestic hot water heaters. More recently, it has been recognized that economies in initial equipment cost and subsequent operating expenses could be realized by combining a filter with a heater to produce what may be termed a filter-heater combination. Such an apparatus is shown and described in U.S. Patent 3,139,067, which issued on June 30, 1964.

Various requirements must be met in a filter-heater combination including, for example, high rates of filtration, efficient heat exchange, easy repair and replacement of parts, low fabrication costs, safety with respect to external temperatures and pressure relief and long operating cycles. It is also desirable that the unit be small, when compared to the sizes of the separate units it functionally replaces and cost less than would be total cost of such separate units.

Accordingly, it is an object of this invention to provide a filter-heater combination wherein both filter and heater are in vertical alignment within a single shell.

Another object of the invention is to provide a filter-heater combination enclosed in a housing wherein a stream of air is utilized to both cool the apparatus enclosed by the housing and reduce the stack temperatures of the apparatus.

It is also an object of the invention to provide a filter-heater combination wherein the filter operates at a high flow rate utilizing sand of a single mesh, without the customary beds of graded aggregate supporting the filter medium and wherein provision is made for both primary and secondary filtration.

A further object of the invention is the provision of a readily replaceable gas to liquid heat exchanger, preferably including means for retarding flow of combustion products, located within the chimney of a filter-heater combination.

Still another object of the invention is to provide filter-heater combination wherein all surfaces dividing filter from heater are heat exchange surfaces located in such a manner as to prevent condensation and thus minimize corrosion.

It is also an object of the invention to provide, within a single housing, a filter, a heater, a pump and all controls necessary for the heating and filtration water.

An additional object of the invention is to provide a filter-heater combination which may use a variety of liquid and gaseous carbonaceous fuels.

The invention also has as an object the provision of a dual filtration system wherein a bed of sand constitutes a primary filter and the water collecting means constitute a secondary filtration system.

Other objects of the invention are to provide an improved filter-heater combination which is sturdy in construction, inexpensive to produce, has a low operating and maintenance cost, is highly efficient in operation, includes integral safety features and is pleasing in appearance.

These as well as other related objects of the invention will be apparent to those skilled in the art from a consideration of the description which follows, when read in conjunction with the drawings, in which:

FIGURE 1 represents a section taken through a filter-heater combination embodying the invention.

FIGURE 2 represents a fragmentary section taken generally on line 2—2 of FIGURE 1.

FIGURE 3 represents a section taken on line 3—3 of FIGURE 2.

FIGURE 4 represents a section taken on line 4—4 of FIGURE 2.

Referring now to the drawings, wherein like reference numerals designate like parts, it will be observed that the filter-heater combination comprises a generally cylindrical shell A, through which passes a chimney B and both of which are enclosed by a housing C.

Figure 5:
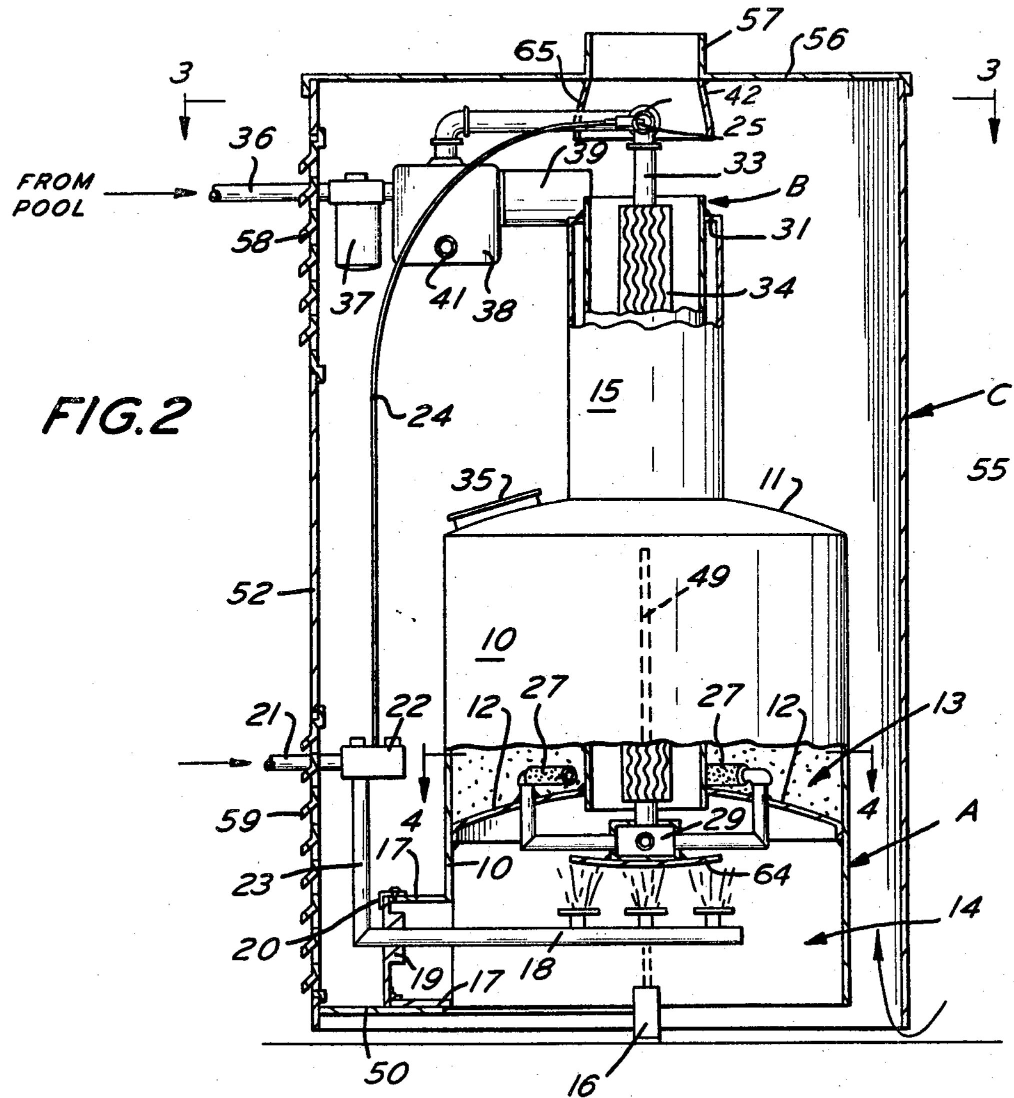
FIGURE 5 represents a section taken on line 5—5 of FIGURE 1.

Shell A includes side walls 10, a head 11 and a transverse internal partition 12 which divides the interior of the shell into an upper filter chamber, generally 13, and a lower vertically aligned combustion chamber, generally 14. Chimney B extends longitudinally from chamber 14 through the filter chamber 13 and thence through head 11 to the exterior of shell A. If desired, shell A may be provided with a liquid jacket 15 which encases the chimney and which is in hydraulic communication with filter 13.

Shell A is supported off the ground by a plurality of legs 16 which may be welded to the bottom of wall 10. All or a variable portion of the opening beneath the wall and the ground may be utilized for the admission of combustion air to chamber 14. The portion of shell A located in the vicinity of chamber 14 may be modified, as by the provision of a rectangular hand hole 17, for the removable mounting of a plurality of burner assemblies 18 which extend into the combustion chamber 14. Various mounting means may be used including, for example, the expedient of cantilevering the assemblies 18 from a support plate 19 which is clamped to the face of hand hole 17 as with clamps 20.

In the instant embodiment gaseous fuel is utilized which enters through line 21, flows through thermostatic controller 22 into delivery line 23 and thence to the burner assemblies. Associated with controller 22 is a capillary 24 which transmits information on temperature from a sensing head 25 to the controller 22 and causes modulation of the fuel supply. The controller is a conventional unit of the type sold under the trademark "Unitrol" by the Grayson Control Division of the Robertshaw-Fulton Controls Co. and is described fullly, inter alia, in their bulletins 28-050-0046 and 28-050-0069D as well as in U.S. Patents Nos. 2,953,937 and 2,982,148. Briefly, these devices use temperature, as measured by head 25, as a parameter for controlling gas flow while, at the same time, supplying a pilot light quantity of gas via a small line (not shown) to the burner assemblies independent of temperature variations. These controls further incorporate manual on-off features and fail-safe mechanism which detect the absence of flame and shut down the fuel supply in such an event.

Other fuel sources such as oil can be used in which case appropriate controls (i.e. stack relay, aquastat, etc.) would be utilized. However, since the visible presence of an oil storage tank, would, in most cases, be undesirable in a swimming pool area, gas is generally preferred.

Filter chamber 13 contains a primary filter in the form of a bed of sand or other siliceous material 26 which is supported by walls 10 and partition 12 and substantially fills the chamber. Water flowing downward through the primary filtering medium 26 enters a plurality of foraminous secondary filters 27, which also serve as collectors, each mounted on a pipe 28 which penetrate partition 12 and converge within chamber 14 in a junction box 29. A flame spreader 64 may be mounted beneath box 29 to distribute the flame evenly beneath partition 12 and to retard flow of heat up chimney B.

Filters 27 are preferably formed of a porous material. These secondary filters may be internally threaded or otherwise mounted on the ends of pipe 28. Suitable porous ceramic filters for use in the invention include, for example, that marketed as the Model A Filtros filter by Filtros, Inc., which is pictured and described between pages 2628 and 2629 of volume I of "Thomas Register of American Manufactures" (1961 edition) and also in Bulletin 15 of that company. A typical unit suitable for use wherein pipe 28 is 1¼" in diameter, measures 3½" in diameter x 12" in length and contains 150 square inches of porous area. These units are available in lengths up to 24". Other materials such as sintered metal are suitable for use in this application. The main requirements of the porous block are structural stability, a high rate of flow per square inch of surface, and the ability not to pass particles of filtering medium 26. The size of foreign material which will be removed by filters 27 is a function of the porosity selected and removal of particles as small as 10 microns is possible.

The base of chimney B extends into chamber 14 and the terminal portion of the chimney is affixed, as by weld 30, to partition 12. An annular cap 31 at the open end of jacket 15 serves to define the upper end of the chimney and it may be welded to this cap. The exterior of the chimney, at a location between the terminus of cap 15 and the surface of filter medium 26 may be provided with an annular deflector plate 32 which serves to prevent direct impingement of entering liquid upon the bed of filter medium 26 and thus negative hydraulic erosion.

A gas to liquid heat exchanger is removably mounted within chimney B and the type illustrated is of fin tube construction having an internal tube 33 provided with a plurality of radially extending fins 34. The liquid inlet end of tube 33 is threaded into or otherwise affixed to junction box 29 and the discharge end of the tube connects to the swimming pool piping. Fins 34 are contoured to retard the flow of gaseous combustion products up chimney B and also provide additional surface for heat transfer from gas to liquid.

Before discussing the construction and function of housing C, which is optional with respect to various embodiments of the invention, the piping and operation of the filter-heat combination will be discussed.

At the time of installation, filter 13 is charged with filtering sand through a hand hole 35 provided in head 11. This hand hole also gives access to the interior of the filter for repair or replacement of secondary filters 27 and for periodic determination of the condition of filtering medium 26. Water to be heated and filtered enters the unit through suction line 36 and proceeds via a hair-trap 37 to the suction side of a centrifugal pump 38.

The pump 38 is of a conventional type and is driven by an electric motor 39. Unfiltered, unheated water flows through a discharge line 40 into the annual space between jacket 15 and chimney B. Line 40 is also provided with a shut-off valve 41 which is left open while the unit is "on stream." It is preferred that the entry of water from line 40 into the water jacket be tangential, so as to produce maximum vortical circulation about chimney B and thus increase heat transfer. The flows which have just been described are illustrated by the arrows in FIGURE 3.

As best seen in FIGURE 1, the liquid moves downward through the jacket, is diverted by deflector plate 32 and enters filter medium 26 at a substantially uniform mass rate per square inch of top surface. The primary filtering action occurs as the water moves downward through the medium 26. There is also simultaneous heat exchange between the water and chimney B. When the water reaches secondary filters 27, it passes through them and is additionally filtered. Since the porous ceramic or sintered material from which the collectors are made may be selected in a wide range of porosity, as much additional polishing can be achieved as desired by providing collectors with openings smaller than is necessary for the mere exclusion of filter medium 26. Mass flow rates will of course decrease as pore size decreases. Water collected through the filters 27 enters pipes 28 and, since these are in the combustion chamber 14, additional heat exchange occurs. However, most of the heat exchange occurs as the water subsequently passes upward through tube 33. At the liquid outlet of the heat exchanger, a T 42 is provided and it is this T which contains sensing head 25. One leg of the T is connected to a clear heated water return line 43, provided with a valve 44 which is left open when the unit is "on stream." Sensing head 25, as has been explained, controls the fuel supply and thus the discharge water temperature.

The balance of the piping shown, essentially in diagrammatic form, pertains to the "backwash" portion of the filtration cycle. When the filtering medium 26 and/or filters 27 have become dirty and full of foreign material (as is customarily determined from differential readings of pressure gauges indicating increased pressure drop through the filter), it is necessary to backwash. This is accomplished, essentially, by a reversal of flow. In normal sand filters, great care must be used with respect to rate of reverse flow since these filters contain graded beds of aggregate and the gradation cannot be upset by the hydraulic turbulence of backwashing if the filtration function is to remain uneffected. However, in the instant invention, rates of backwash are possible which are equivalent to the filtration rates. This is possible because of the nature of filters 27 and because of the single size of aggregate which is used as filter medium 26. Backwashing is accomplished as follows:

A backwash pump line 45 containing a valve 46 connects to T 42. Also a sewer line 47, including a shut-off valve 48, is provided in the unit somewhere above the level of filter medium 26 as, for example, near the top of jacket 15. When it is desired to backwash the filter, the unit is shut down and valves 41 and 44 are closed. Valves 46 and 48 are opened. When the pump is again started, water will travel downward through internal tube 33 out through filters 27, removing dirt from the pores and then upward through filter medium 26 and thence, via line 47 to the sewer. When this water runs clean, backwashing has been effected and the valves can be restored to their "on stream" status.

What has just been described constitutes the essential operating components of the invention. While the unit is perfectly adequate as heretofore described, it is exceedingly desirable, particularly for residential purposes, to provide a unit which is housed in a single compact housing and which conceals as much of the functional portion of the apparatus as possible to present a clean and pleasing aesthetic appearance. To this end such expedients as the mounting of the pump, motor and valves in close proximity to the shell and supported thereby are desirable. It is further desirable to provide a housing for the unit which will shield and weatherproof all of the components and, at the same time, have a low temperature and consequently be safe to touch. Further, said housing should make provision for safe disposition of combustion gases and also provide means for preventing back-drafts down chimney B. All of these ends are accomplished by housing C which will now be discussed in detail.

When a cover is utilized, the filter-heater combination is provided with a plurality of vertical support angles 49 which are welded or otherwise attached to shell A. The shell further has affixed to it a contoured horizontal plate 50 which closes the annular gap between the housing C and the shell A for a portion of the perimeter of the shell.

Housing C, which mounts on and is supported by angles 49, as with screws 51, is preferably made of sheet metal and includes a front wall 52, a canted left side wall 53, a canted right side wall 54, and an arcuate rear wall 55. It is also provided with a top 56 which includes a vent or air discharge means 57, shown here in the form of a collar including a dependent frusto-conical internal draft diverter 65. Appropriate holes are provided in the walls of the housing to permit passage therethrough of the various pipes previously discussed.

Additionally, the front wall 52 is provided with a removable louvered access panel 58 for giving access to the pump and valves, as well as a similar panel 59 giving access to the thermostatic controller and burner assemlies. For major repairs, the entire housing may be removed by removing screws 51, disconnecting the piping which penetrates the housing and lifting the housing off shell A.

As will be observed in FIGURES 1 and 2, the housing terminates above the surface on which legs 16 rests and is consequently spaced-apart from that surface. Air cannot enter between the housing and the shell in the area where plate 50 exists and its entrance, as shown by the arrow in FIGURE 2, is consequently up along rear wall 55. Heat given off by shell A, particularly proximate combustion chamber 14 will cause a thermal flow of air upward inside of housing C and up through vent 57. This analysis, however, neglects the fact that the gaseous products of combustion are being discharged from chimney B within the housing C. It is desired to reduce the temperature of these gases before they are discharged from the housing and also to provide means for preventing back-drafts such as might occur due to gusts of wind were no such provision made. Such back-drafts could, blow out the flame and, while the controller 22 would cut off the supply of fuel, the necessity for relighting the burners could be a source of annoyance. To this end, a roof ventilator, generally 60, is mounted on vent 57. This ventilator includes a plurality of internal baffles 61 and a plurality of external baffles 62. These baffles prevent the wind, regardless of its direction, from blowing down chimney B and actually convert the wind force into a positive suction. Roof 63 serves to weatherproof the unit and prevent rain from entering the chimney. Suitable ventilators for this purpose include those manufactured by the G. C. Breidert Co. and termed Type F Breidert Air-X-Hausters. These are shown and described on page 8410 of "Thomas Register of American Manufacturers" (1961 edition).

Gaseous combustion products leaving the chimney B merge with the air which has come up through the interior of housing C. What exits through ventilator 60 is a low temperature mixture of gaseous combustion products and air. The thermal flow of air within the housing serves to insulate the unit and make the housing cool to the touch. It further cools the exterior of shell A and dissipates the heat given off by motor 39.

Many variations of the invention will be obvious to those skilled in the art with the instant disclosure before them. Consequently, the appended claims have been drawn to cover all legitimate modifications and adaptations.

Having described my invention, I claim:

1. A filter-heater combination comprising:

a single shell including a head and a transverse internal partition dividing the interior of said shell into a filter chamber, adapted to hold a primary silicious filtering medium, and a vertically aligned combustion chamber;

fuel burner means located in said combustion chamber;

a chimney extending longitudinally from said combustion chamber through said head;

a gas to liquid heat exchanger mounted in said chimney and including a cold liquid inlet and a warm liquid outlet;

porous secondary filter means located in said filter chamber proximate said transverse partition and adapted to be embedded in said primary filtering medium;

a first conduit for conducting cold unfiltered liquid into said filter chamber, above said primary filtering medium;

liquid transfer means linking said secondary filter means and the inlet of said heat exchanger; and second conduit means for removing filtered and heated liquid from said heat exchanger.

2. The apparatus of claim 1 wherein said heat exchanger includes means for retarding the flow of gaseous combustion products up said chimney.

3. The appartus of claim 1 which further includes means for distributing liquid entering from said first conduit uniformly across the cross-section of said filter chamber.

4. The apparatus of claim 1 wherein said chimney extends longitudinally beyond said head and wherein, further, said extending portion is provided with a liquid jacket which is in hydraulic communication with said filter chamber.

5. The apparatus of claim 4 wherein said first conduit enters said liquid jacket tangentially so as to create vortical flow therein.

6. The apparatus of claim 5 wherein said heat exchanger includes radially extending means for retarding the flow of gaseous combustion products thereabout.

7. The apparatus of claim 2 which further includes a housing mounted about said shell, said housing having air inlet means proximate its bottom and air discharge means proximate its top, air entering through said inlet rising and cooling the exterior of said shell as it flows upward and mingling, within said housing proximate said air discharge means with gaseous combustion products being discharged from said chimney.

8. The apparatus of claim 7 wherein further a pump and valves for control of said conduits are supported by said shell and mounted within said housing.

9. The apparatus of claim 7 wherein said chimney extends longitudinally beyond said head and wherein, further, said extending portion is provided with a liquid jacket which is in hydraulic communication with said filter chamber.

10. The apparatus of claim 9 wherein said secondary filter means is made of ceramic.

References Cited

UNITED STATES PATENTS

| | | | |
|---|---|---|---|
| 1,737,202 | 11/1929 | Runnels | 122—18 |
| 2,744,503 | 5/1956 | Millsaps et al. | 122—17 |
| 3,139,067 | 6/1964 | Van den Broek et al. | 122—18 |

KENNETH W. SPRAGUE, *Primary Examiner.*